US009621881B2

(12) United States Patent
Lee et al.

(10) Patent No.: US 9,621,881 B2
(45) Date of Patent: Apr. 11, 2017

(54) STEREOSCOPIC IMAGE DISPLAY DEVICE AND OPERATING METHOD THEREOF

(71) Applicant: Samsung Display Co., Ltd., Yongin, Gyeonggi-Do (KR)

(72) Inventors: Chang Hoon Lee, Seoul (KR); Won Sang Park, Yongin-si (KR); Jong-In Baek, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 360 days.

(21) Appl. No.: 14/296,036

(22) Filed: Jun. 4, 2014

(65) Prior Publication Data
US 2015/0172647 A1    Jun. 18, 2015

(30) Foreign Application Priority Data
Dec. 16, 2013  (KR) ........................ 10-2013-0156602

(51) Int. Cl.
*H04N 13/04*    (2006.01)
(52) U.S. Cl.
CPC ..... *H04N 13/0497* (2013.01); *H04N 13/0438* (2013.01); *H04N 13/0481* (2013.01)
(58) Field of Classification Search
None
See application file for complete search history.

(56) References Cited

U.S. PATENT DOCUMENTS

| 5,872,590 A * | 2/1999 | Aritake | ............. H04N 13/0497 348/54 |
| 2003/0095177 A1* | 5/2003 | Yun | ...................... H04N 13/004 348/42 |
| 2009/0092335 A1* | 4/2009 | Kim | ..................... H04N 13/004 382/285 |
| 2011/0038042 A1* | 2/2011 | Redmann | ............... G03B 35/18 359/462 |

* cited by examiner

*Primary Examiner* — Geepy Pe
(74) *Attorney, Agent, or Firm* — Innovation Counsel LLP (57) ABSTRACT

A display device may include a signal controller to use a received image signal to generate sectional image signals, to determine a sequence for displaying sectional images that respectively correspond to the sectional image signals, and to use the sectional image signals to generate an image data signal. The sectional images may include a top left image, a bottom left image, a top right image, and a bottom right image. The device may further include a display panel to display the sectional images according to data signals generated based on the image data signal and according to the sequence. The sectional images may be portions of a whole image that has a size substantially equal to a display area of the display panel.

17 Claims, 4 Drawing Sheets

STEREOSCOPIC IMAGE DISPLAY DEVICE AND OPERATING METHOD THEREOF

CROSS-REFERENCE TO RELATED APPLICATION

This application claims priority to and the benefit of Korean Patent Application No. 10-2013-0156602 filed in the Korean Intellectual Property Office on Dec. 16, 2013, the entire contents of which are incorporated herein by reference.

BACKGROUND (a) Technical Field

The present invention relates to a stereoscopic image display device and a driving (i.e., operating and/or controlling) method thereof.

(b) Description of the Related Art

In general, a stereoscopic image display device may generate a left eye image and a right eye image and may project the left eye image and the right eye image to a user's left eye and right eye, respectively. Binocular parallax in a horizontal direction may occur between the user's left eye and right eye, such that the user may perceive a stereoscopic effect.

The above information disclosed in this Background section is for enhancement of understanding of the background of the invention. This Background section may contain information that does not form the prior art that is already known in this country to a person of ordinary skill in the art.

SUMMARY

Embodiments of the present invention may advantageously enable stereoscopic images to be perceived with satisfactory quality by a viewer whose eyes may be positioned at various heights with respectives to a display device. Embodiments of the invention may include the display device a method for controlling and/or operating the display device.

An embodiment of the invention may be related to a display device that may include a signal controller and a display panel. The signal controller may be configured to use a received image signal to generate sectional image signals, configured to determine a sequence for displaying sectional images that respectively correspond to the sectional image signals, and configured to use the sectional image signals to generate an image data signal. The sectional image signals may include a top left image signal, a bottom left image signal, a top right image signal, and a bottom right image signal. The sectional images may include a top left image, a bottom left image, a top right image, and a bottom right image. The signal controller may include hardware for performing one or more tasks of the signal controller. The display panel may be configured to display the sectional images according to data signals generated based on the image data signal and according to the sequence. The sectional images may be portions of a whole image (i.e., a frame) that has a size substantially equal to a display area of the display panel. The display may be called a stereoscopic image display device since the sectional images may be construed to be stereoscopic images configured for generating stereoscopic effects.

The top left image may represent an image of a viewed point of an object that is viewed by the left eye of a viewer from a first viewpoint positioned above an imaginary reference plane that passes through the viewed point and is perpendicular to a display surface of the display panel. A first imaginary view line connecting the viewed point and the first viewpoint may be at a first predetermined angle with respect to the imaginary reference plane.

The bottom left image may represent an image of the viewed point of the object that is viewed by the left eye of the viewer from a second viewpoint positioned under the imaginary reference plane. A second imaginary view line connecting the viewed point and the second viewpoint may be at a second predetermined angle with respect to the imaginary reference plane.

The top right image may represent an image of the viewed point of the object that is viewed by the right eye of the viewer from a third viewpoint positioned above the imaginary reference plane. A third imaginary view line connecting the viewed point and the third viewpoint may be at third predetermined angle with respect to the imaginary reference plane.

The bottom right image may represent an image of the viewed point of the object that is viewed by the right eye of the viewer from a fourth viewpoint positioned under the reference plane. A fourth imaginary line connecting the viewed point and the fourth viewpoint may be at a fourth predetermined angle with respect to the imaginary reference plane.

The first predetermined angle may be equal to the third predetermined angle.

The first predetermined angle may be equal to the second predetermined angle.

The image signal may include a left eye image signal and a right eye image signal. The left eye image signal may include top left image information and bottom left image information. The signal controller may generate the top left image signal and the bottom left image signal by separating the top left image information and bottom left image information. The right eye image signal may include top right image information and bottom right image information. The signal controller may generate the top right image signal and the bottom right image signal by separating the top right image information and bottom right image information.

The image signal may include a left eye image signal and a right eye image signal. The signal controller may apply a first transformation matrix to transform at least a first portion of the left eye image signal into the top left image signal. The signal controller may apply a second transformation matrix to transform at least a second portion of the left eye image signal into the bottom left image signal. The signal controller may apply a third transformation matrix to transform at least a first portion of the right eye image signal into the top right image signal. The signal controller may apply a fourth transformation matrix to transform at least a second portion of the right eye image signal into the bottom right image signal.

The signal controller may arrange the sectional image signals according to the sequence in the image data signal.

The signal controller may generate one or more control signals for controlling the display panel to display all of the sectional images in (or within) 1/60 second according to the sequence.

The display device may include a first shutter configured to be light-transmitting in a first period and in a second period immediately following the first period and configured to be light-blocking in a third period immediately following second period and in a fourth period immediately following the third period. The display device may further include a second shutter configured to be light-blocking in the first period and the second period and configured to be light-transmitting in the third period and in the fourth period. The display panel may sequentially display four of the sectional images in the first period, the second period, the third period, the fourth period, respectively, according to the sequence.

An embodiment of the invention may be related to a method for operating a display device. The method may include the following steps: generating sectional image signals using a signal controller and a received image signal, the sectional image signals comprising a top left image signal, a bottom left image signal, a top right image signal, and a bottom right image signal; determining a sequence for displaying sectional images that respectively correspond to the sectional image signals, the sectional images being portions of a whole image (i.e., a frame) that has a size substantially equal to a display area of a display panel, the sectional images comprising a top left image, a bottom left image, a top right image, and a bottom right image; using the sectional image signals to generate an image data signal; and using the display panel to display the sectional images according to data signals generated based on the image data signal and according to the sequence. The method may include generating the data signals based on the image data signal.

The top left image may represent an image of a viewed point of an object that is viewed by the left eye of a viewer from a first viewpoint positioned above an imaginary reference plane that passes through the viewed point and is perpendicular to a display surface of the display panel. A first imaginary view line connecting the viewed point and the first viewpoint may be at a first predetermined angle with respect to the imaginary reference plane.

The bottom left image may represent an image of the viewed point of the object that is viewed by the left eye of the viewer from a second viewpoint positioned under the imaginary reference plane. A second imaginary view line connecting the viewed point and the second viewpoint may be at a second predetermined angle with respect to the imaginary reference plane.

The top right image may represent an image of the viewed point of the object that is viewed by the right eye of the viewer from a third viewpoint positioned above the imaginary reference plane. A third imaginary view line connecting the viewed point and the third viewpoint may be at third predetermined angle with respect to the imaginary reference plane.

The bottom right image may represent an image of the viewed point of the object that is viewed by the right eye of the viewer from a fourth viewpoint positioned under the reference plane. A fourth imaginary line connecting the viewed point and the fourth viewpoint may be at a fourth predetermined angle with respect to the imaginary reference plane.

The first predetermined angle may be equal to the third predetermined angle.

The first predetermined angle may be equal to the second predetermined angle.

The image signal may include a left eye image signal and right eye image signal. The left eye image signal may include top left image information and bottom left image information. The right eye image signal may include the top right image information and bottom right image information. The step of generating the sectional image signals may include the following steps: generating the top left image signal and the bottom left image signal by separating the top left image information and bottom left image information; and generating the top right image signal and the bottom right image signal by separating the top right image information and bottom right image information.

The image signal may include a left eye image signal and a right eye image signal. The step of generating the sectional image signals may include the following steps: applying a first transformation matrix to transform at least a first portion of the left eye image signal into the top left image signal; applying a second transformation matrix to transform at least a second portion of the left eye image signal into the bottom left image signal; applying a third transformation matrix to transform at least a first portion of the right eye image signal into the top right image signal; and applying a fourth transformation matrix to transform at least a second portion of the right eye image signal into the bottom right image signal.

The method may include the following step: arranging the sectional image signals according to the sequence in the image data signal.

The method may include the following step: generating one or more control signals for controlling the display panel to display all of the sectional images in 1/60 second according to the sequence.

The method may include the following steps: controlling a first shutter to be light-transmitting in a first period and in a second period immediately following the first period; controlling the first shutter to be light-blocking in a third period immediately following second period and in a fourth period immediately following the third period; controlling a second shutter configured to be light-blocking in the first period and the second period; controlling the second shutter to be light-transmitting in the third period and in the fourth period; and using the display panel to sequentially display four of the sectional images in the first period, the second period, the third period, the fourth period, respectively, according to the sequence.

The method may include the following steps: disposing the first shutter between the display panel and the left eye of a viewer; and disposing the second shutter between the display panel and the right eye of the viewer.

An embodiment may be related to a stereoscopic image display device that may include the following elements: a signal controller for generating a top left image signal, a bottom left image signal, a top right image signal, and a bottom right image signal for displaying a stereoscopic image from an image signal, arranging them according to a displaying order, and generating an image data signal; and a display for displaying a top left image, a bottom left image, a top right image, and a bottom right image according to the image data signal.

The top left image may represent an image when an object is over-viewed by the left eye with a predetermined angle, the bottom left image may represent an image when an object is under-viewed by the left eye with a predetermined angle, the top right image may represent an image when an object is over-viewed by the right eye with a predetermined angle, and the bottom right image may represent an image when an object is under-viewed by the right eye with a predetermined angle.

The image signal may include a left eye image signal and a right eye image signal, the left eye image signal may include information on the top left image and the bottom left image, and the right eye image signal may include information on the top right image and the bottom right image.

The signal controller may generate the top left image signal and the bottom left image signal from the left eye image signal, and may generate the top right image signal and the bottom right image signal from the right eye image signal.

The signal controller generate the top left image signal and the bottom left image signal by using a first transformation matrix transformed into an image when an image generated from the left eye image signal is over-viewed with a predetermined angle and a second transformation matrix transformed into an image when the image is under-viewed with a predetermined angle, and may generate the top right image signal and the bottom right image signal by using a third transformation matrix transformed into an image when an image generated from the right eye image signal is over-viewed with a predetermined angle and a fourth transformation matrix transformed into an image when the image is under-viewed with a predetermined angle.

The stereoscopic image display device further may include the following elements: a data driving circuit for generating a plurality of data voltages according to the image data signal, and supplying the same to a plurality of data lines; and a scan driving circuit for supplying a plurality of scan signals to a plurality of scan lines, wherein the display may include a plurality of pixels connected to the plurality of data lines and the plurality of scan lines.

The signal controller may generate a first driving control signal for operating the data driving circuit and a second driving control signal for operating the scan driving circuit according to a driving frequency for displaying the top left image signal, the bottom left image signal, the top right image signal, and the bottom right image signal.

The data driving circuit may sample and hold the image data signal according to the first driving control signal to transform the same into the plurality of data voltages, and transmits the data voltages to the data lines.

The scan driving circuit may generate a plurality of scan signals according to the second driving control signal and supplies the same to a plurality of scan lines.

A stereoscopic image is provided using shutter spectacles in which a left eye glass is opened and a right eye glass is closed during a first period in which an image following the top left image signal and the bottom left image signal is displayed, and the right eye glass is opened and the left eye glass is closed during a second period in which an image following the right eye image signal and the bottom right image signal is displayed.

An embodiment of the invention may be related to a method for driving (i.e., operating and/or controlling) a stereoscopic image display device. The method may include the following steps: generating a top left image signal, a bottom left image signal, a top right image signal, and a bottom right image signal for displaying a stereoscopic image from an image signal; generating an image data signal by arranging the top left image signal, the bottom left image signal, the top right image signal, and the bottom right image signal according to a displaying order; and displaying a top left image, a bottom left image, a top right image, and a bottom right image according to the image data signal.

The step of generating the top left image signal, the bottom left image signal, the top right image signal, and the bottom right image signal may include generating the top left image signal and the bottom left image signal from the left eye image signal, and generating the top right image signal and the bottom right image signal from the right eye image signal.

The step of generating the top left image signal, the bottom left image signal, the top right image signal, and the bottom right image signal may include: generating the top left image signal and the bottom left image signal by using a first transformation matrix transformed into an image when an image generated from the left eye image signal is over-viewed with a predetermined angle and a second transformation matrix transformed into an image when the image is under-viewed with a predetermined angle; and generating the top right image signal and the bottom right image signal by using a third transformation matrix transformed into an image when an image generated from the right eye image signal is over-viewed with a predetermined angle and a fourth transformation matrix transformed into an image when the image is under-viewed with a predetermined angle.

DETAILED DESCRIPTION OF THE EMBODIMENTS

In the following detailed description, embodiments of the invention are described with reference to drawings. As those skilled in the art would realize, the described embodiments may be modified in various ways, all without departing from the spirit or scope of the invention. The drawings and description are illustrative in nature and not restrictive. Like reference numerals may designate like elements in the drawings and description.

In this application, when it is described that an element is "coupled" or "connected" to another element, the element may be "directly coupled" to the other element and/or may be "electrically coupled" to the other element through a third element. Unless explicitly described to the contrary, the word "comprise" and variations such as "comprises" or "comprising" may imply inclusion of stated elements but may not imply exclusion of other elements.

Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Various embodiments, including methods and techniques, are described in this disclosure. It should be kept in mind that the invention might also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments of the invention.

Figure 1:
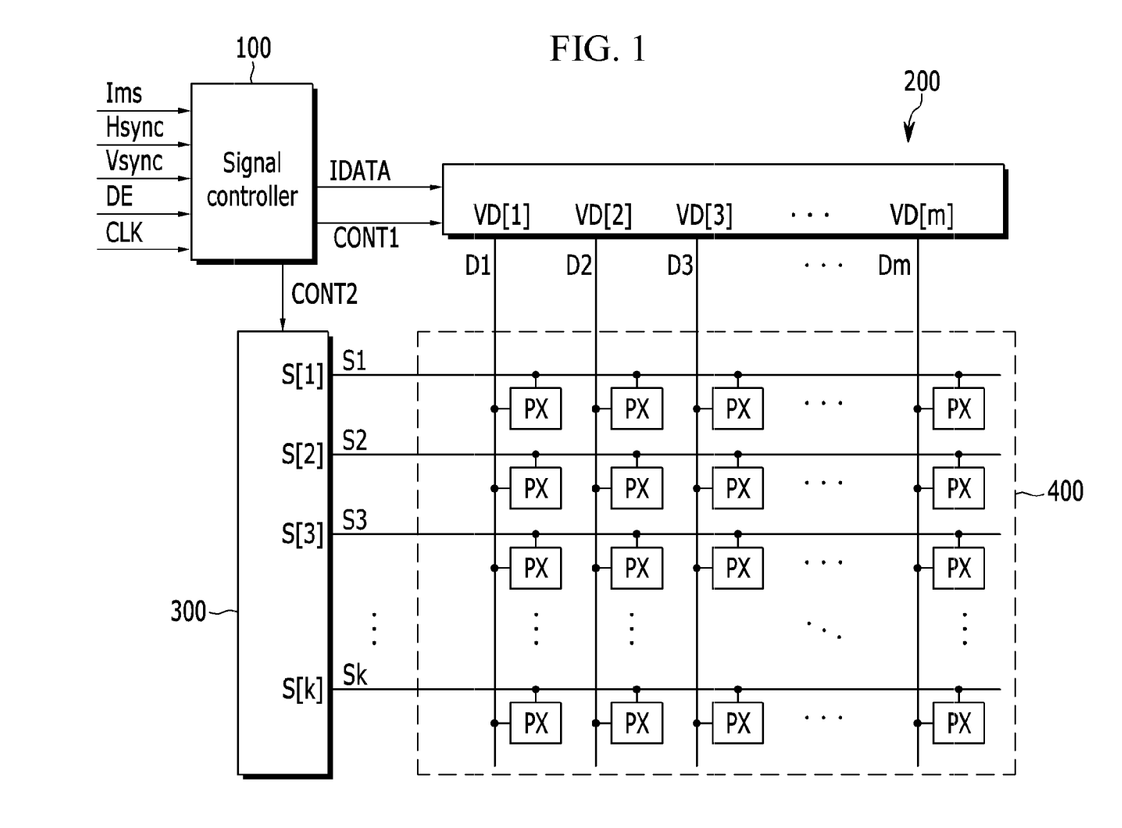
FIG. 1 shows a diagram that illustrates a stereoscopic image display device according to an embodiment of the present invention.

FIG. 1 shows a diagram that illustrates a stereoscopic image display device according to an embodiment of the present invention.

As shown in FIG. 1, the stereoscopic image display device includes a signal controller 100, a data driving circuit 200, a scan driving circuit 300, and a display panel 400 (or display 400).

The signal controller 100 may generate a first control signal (CONT1) and a second control signal (CONT2) in order to control an image displaying operation according to a vertical synchronization signal (Vsync) for distinguishing a frame of the image, a horizontal synchronization signal (Hsync) for distinguishing a line of a frame, a data enable signal (DE) for controlling a period of applying a data voltage to a plurality of data lines (DL1-DLm), and a clock signal (CLK) for controlling driving frequency.

The signal controller 100 may receive an image signal (ImS) The signal controller 100 may generate sectional image signals, including a top left image signal (LOS), a bottom left image signal (LUS), a top right image signal (ROS), and a bottom right image signal (RUS), based on the image signal (ImS) The signal controller 100 may determining a sequence (or order) for displaying sectional images respectively associated with the sectional image signals LOS, LUS, ROS, and RUS. The signal controller 100 may generate an image data signal (IDATA) by arranging the sectional image signals according to the display sequence (or displaying order).

The top left image represents an image of a viewed point of an object that is viewed by the left eye of a viewer from a first viewpoint positioned above an imaginary reference plane (e.g., a horizontal plane) that passes through the viewed point and is perpendicular to a display surface of the display 400, wherein a first imaginary view line connecting the viewed point and the first viewpoint is at a predetermined angle (e.g., a first angle) with respect to the reference plane. The bottom left image represents an image of the viewed point of the object that is viewed by the left eye of the viewer from a second viewpoint positioned under the reference plane, wherein a second imaginary view line connecting the viewed point and the second viewpoint is at a predetermined angle (e.g., a second angle) with respect to the reference plane. The top right image represents an image of the viewed point of the object that is viewed by the right eye of the viewer from a third viewpoint positioned above the reference plane, wherein a third imaginary view line connecting the viewed point and the third viewpoint is at a predetermined angle (e.g., the first angle or a third angle) with respect to the reference plane. The bottom right image represents an image of the viewed point of the object that is viewed by the right eye of the viewer from a fourth viewpoint positioned under the reference plane, wherein a fourth imaginary line connecting the viewed point and the fourth viewpoint is at a predetermined angle (e.g., the second angle or a fourth angle) with respect to the reference plane. In an embodiment, two or more of the predetermined angles may be equal to each other. The first angle may be equal to the third angle, and the second angle may be equal to the fourth angle. The first angle may be equal to the second angle. The first view line and the third view line may be positioned on (or belong to) a same imaginary plane. The second view line and the fourth view line may be positioned on (or belong to) a same imaginary plane.

Figure 2:
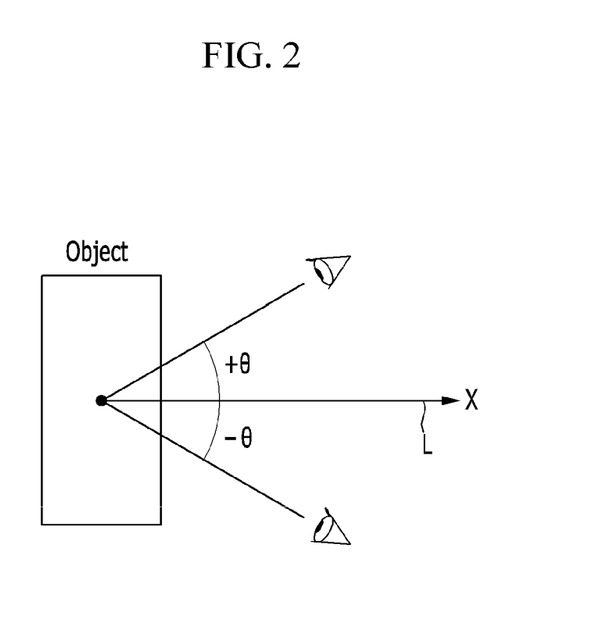
FIG. 2 shows a diagram (e.g., a schematic side view) that illustrates examples of viewing an image from viewpoints not in a reference plane perpendicular to a display surface of a stereoscopic image display device according to an embodiment of the present invention.

FIG. 2 shows a diagram (e.g., a schematic side view) that illustrates examples of viewing an image from viewpoints not in the reference plane (which perpendicular to a display surface of display 400) according to an embodiment of the present invention.

As shown in FIG. 2, in an embodiment, the first view line and/or the third view line may be at an angle of +θ with respect to that the reference plane L, which may extend in a horizontal direction (i.e., x direction) from the viewed point (e.g., the center) of the object. The first angle may be equal to +θ, and/or the third angle may be equal to +θ. The second view line and/or the fourth view line may be at an angle of −θ with respect to that the reference plane L.

The signal controller 100 may generate a top left image signal (LOS) and a bottom left image signal (LUS) using the left eye image signal included in the image signal (ImS).

In an embodiment, the left eye image signal may include information specifically associated with the top left image and information specifically associated with the bottom left image, and the signal controller 100 may separate the top left image information and the bottom left image information to generate the top left image signal (LOS) and the bottom left image signal (LUS).

In an embodiment, the left eye image signal may not readily include distinct information respectively associated with each of the top left image and the bottom left image, and the signal controller 100 may generate the top left image signal (LOS) and the bottom left image signal (LUS) by processing the left eye image signal.

For example, the signal controller 100 may apply a first transformation matrix associated with the first viewpoint to transform (at least a portion of) the left eye image signal into the top left image signal (LOS) and may apply a second transformation matrix to transform (at least a portion of) the left eye image signal into the bottom left image signal (LUS).

In an embodiment, the right eye image signal may include information specifically associated with the top right image and information specifically associated with the bottom right image, and the signal controller 100 may separate the top right image information and the bottom right image information to generate the top right image signal (ROS) and bottom right image signal (RUS).

In an embodiment, the right eye image signal may not readily include distinct information respectively associated with each of the top right image and the bottom right image, and the signal controller 100 may generate the top right image signal (ROS) and the bottom right image signal (RUS) by processing the right eye image signal.

For example, the signal controller 100 may apply a third transformation matrix associated with the third viewpoint to transform (at least a portion of) the right eye image signal into the top right image signal (ROS) and may apply a fourth transformation matrix to transform (at least a portion of) the right eye image signal into the bottom right image signal (RUS).

A driving frequency of the display device according to an embodiment may be 240 Hz. That is, the top left image, the bottom left image, the top right image, and the bottom right image are sequentially displayed within 1/60 of a second. The signal controller 100 may generate a first driving control signal (CONT1) for operating the data driving circuit 200 according to the driving frequency of 240 Hz and may generate a second driving control signal (CONT2) for operating the scan driving circuit 300.

The data driving circuit 200 may sample and hold an image data signal (IDATA) according to the first driving control signal (CONT1) to transform IDATA into a plurality of data voltages (VD[1]-VD[m]). Subsequently, the data driving circuit may transmit the data voltages to a plurality of data lines (D1-Dm) according to the first driving control signal (CONT1).

The scan driving circuit 300 may generate scan signals (S[1]-S[k]) that correspond to scan times and may provide the scan signals to a plurality of scan lines (S1-Sn) as low level pulses according to the second driving control signal (CONT2).

The display 400 includes the plurality of scan lines (S1-Sn), the plurality of data lines (D1-Dm), and a plurality of pixels (PX).

The scan lines (S1-Sn) may extend in a horizontal direction, and the data lines (DL1-DLm) may extend in a vertical direction, when the display 400 is in a normal operating state.

Figure 3:
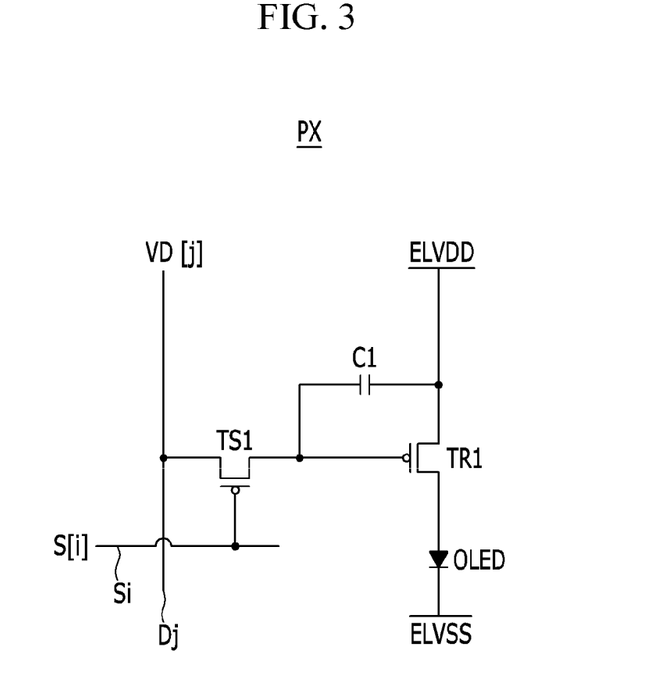
FIG. 3 shows a diagram that illustrates a pixel circuit of a pixel according to an embodiment of the present invention.

FIG. 3 shows a diagram that illustrates a pixel circuit of a pixel PX of display 400 according to an embodiment of the present invention.

As shown in FIG. 3, the pixel (PX) includes a driving transistor (TR1), a switching transistor (TS1), a capacitor (C1), and an organic light emitting diode (OLED).

The pixel (PX) is connected to the data line (Dj) and the scan line (Si). The data voltage (VD[j]) may be supplied to the pixel (PX) through the data line (Dj), and the scan signal (S[i]) may be supplied to the pixel (PX) through the scan line (Si).

The driving transistor (TR1) includes a source connected to a supplying element of a power source voltage (ELVDD), a gate connected to a first electrode of the switching transistor (TS1), and a drain connected to an anode of the organic light emitting diode (OLED).

The organic light emitting diode (OLED) includes a cathode connected to a supplying element of a power source voltage (ELVSS).

The switching transistor (TS1) includes a gate connected to the scan line (Si) for receiving the scan signal (S[i]). The switching transistor (TS1) includes a second electrode connected to the data line (Dj) for receiving the data voltage (VD[j]).

The capacitor (C1) includes a first electrode connected to the gate of the driving transistor (TR1) and includes a second electrode connected to supplying element of the power source voltage (ELVDD).

When the switching transistor (TS1) is turned on by the scan signal (S[i]), the data voltage (VD[j]) is transmitted to the gate of the driving transistor (TR1) through the data line (Dj). A gate-source voltage of the driving transistor (TR1) is maintained by the capacitor (C1), and the driving transistor (TR1) generates a driving current following the gate-source voltage. The organic light emitting diode (OLED) emits light according to the driving current.

In an embodiment, the organic light emitting diode (OLED) is used as a light emitting element, as illustrated in FIG. 3. In an embodiment, a liquid crystal element may be used instead of or in addition to the organic light emitting diode (OLED) as a light emitting element and/or a light control element.

Figure 4:
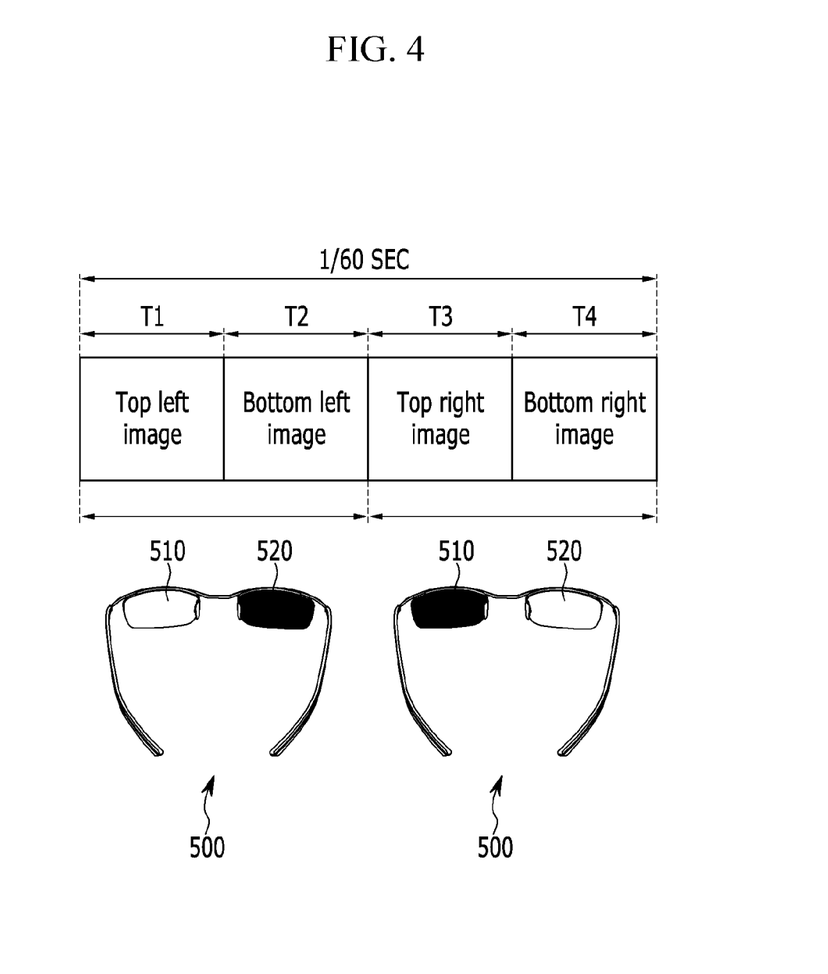
FIG. 4 shows a diagram that illustrates a method for displaying images by controlling a stereoscopic image display device according to an embodiment of the present invention.

FIG. 4 shows a diagram that illustrates a method for displaying images displayed by controlling a stereoscopic image display device according to an embodiment of the present invention.

As shown in FIG. 4, for a unit time of 1/60 of a second, a top left image is displayed by the display 400 during a period T1, a bottom left image during a period T2, a top right image during a period T3, and a bottom right image during a period T4 sequentially, according to 240 Hz.

In an embodiment, the images may be displayed in an order of a top right image, bottom right image, a top left image, and a bottom left image. In an embodiment, the images may be displayed in an order of a bottom left image, a top left image, a bottom right image, and a top right image. In an embodiment, the images may be displayed in an order of a bottom right image, a top right image, a bottom left image, and a top left image.

In an embodiment, the display device may include shutter spectacles 500 for enabling stereoscopic image perception. A left eye glass 510 (or left eye shutter 510) may be opened (or light-transmitting) and a right eye glass 520 (or right eye shutter 520) may be closed during the periods T1 and T2, in which the top left image and the bottom left image are respectively displayed. The right eye glass 520 may be opened and the left eye glass 510 may be closed during the periods T3 and T4, in which the top right image and the bottom right image are respectively displayed.

A display device according to one or more embodiments of the invention may advantageously enable a viewer to perceive stereoscopic images with satisfactory quality even when view lines, which connect a viewed point and viewpoints corresponding to the eyes of the viewer, are not positioned in (or do not belong to) a horizontal plane.

While this invention has been described in connection with practical embodiments, the invention is not limited to the disclosed embodiments. This invention is intended to cover various modifications and equivalent arrangements included within the spirit and scope of the appended claims.

What is claimed is:

1. A display device comprising:
   a signal controller configured to use a received image signal to generate sectional image signals, configured to determine a sequence for displaying sectional images that respectively correspond to the sectional image signals, and configured to use the sectional image signals to generate an image data signal, wherein the sectional image signals comprise a top left image signal, a bottom left image signal, a top right image signal, and a bottom right image signal, and wherein the sectional images comprise a top left image, a bottom left image, a top right image, and a bottom right image; and
   a display panel configured to display the sectional images according to data signals generated based on the image data signal and according to the sequence, wherein the display panel is configured to display the top left image before or after the bottom left image according to the sequence,
   wherein the top left image represents an image of a viewed point of an object that is viewed by the left eye of a viewer from a first viewpoint positioned above an imaginary reference plane that passes through the viewed point and is perpendicular to a display surface of the display panel, wherein a first imaginary view line connecting the viewed point and the first viewpoint is at a first predetermined angle with respect to the imaginary reference plane, wherein the bottom left image represents an image of the viewed point of the object that is viewed by the left eye of the viewer from a second viewpoint positioned under the imaginary reference plane, wherein a second imaginary view line connecting the viewed point and the second viewpoint is at a second predetermined angle with respect to the imaginary reference plane, wherein the top right image represents an image of the viewed point of the object that is viewed by the right eye of the viewer from a third viewpoint positioned above the imaginary reference plane, wherein a third imaginary view line connecting the viewed point and the third viewpoint is at a third predetermined angle with respect to the imaginary reference plane, wherein the bottom right image represents an image of the viewed point of the object that is viewed by the right eye of the viewer from a fourth viewpoint positioned under the reference plane, and wherein a fourth imaginary line connecting the viewed point and the fourth viewpoint is at a fourth predetermined angle with respect to the imaginary reference plane.

2. The display device of claim 1, wherein the first predetermined angle is equal to the third predetermined angle.

3. The display device of claim 1, wherein the first predetermined angle is equal to the second predetermined angle.

4. The display device of claim 1,
wherein the image signal includes a left eye image signal and a right eye image signal,
wherein the left eye image signal includes top left image information and bottom left image information,
wherein the signal controller is configured to generate the top left image signal and the bottom left image signal by separating the top left image information and bottom left image information,
wherein the right eye image signal includes top right image information and bottom right image information, and
wherein the signal controller is configured to generate the top right image signal and the bottom right image signal by separating the top right image information and bottom right image information.

5. The display device of claim 1,
wherein the image signal includes a left eye image signal and a right eye image signal,
wherein the signal controller is configured to apply a first transformation matrix to transform at least a first portion of the left eye image signal into the top left image signal,
wherein the signal controller is configured to apply a second transformation matrix to transform at least a second portion of the left eye image signal into the bottom left image signal,
wherein the signal controller is configured to apply a third transformation matrix to transform at least a first portion of the right eye image signal into the top right image signal, and
wherein the signal controller is configured to apply a fourth transformation matrix to transform at least a second portion of the right eye image signal into the bottom right image signal.

6. The display device of claim 1, wherein the signal controller is configured to arrange the sectional image signals according to the sequence in the image data signal.

7. The display device of claim 1, wherein the signal controller is configured to generate one or more control signals for controlling the display panel to display all of the sectional images in $1/60$ second according to the sequence.

8. The display device of claim 1, further comprising:
a first shutter configured to be light-transmitting in a first period and in a second period immediately following the first period and configured to be light-blocking in a third period immediately following second period and in a fourth period immediately following the third period; and
a second shutter configured to be light-blocking in the first period and the second period and configured to be light-transmitting in the third period and in the fourth period,
wherein the display panel is configured to sequentially display four of the sectional images in the first period, the second period, the third period, the fourth period, respectively, according to the sequence.

9. A method for operating a display device, the method comprising:
generating sectional image signals using a signal controller and a received image signal, the sectional image signals comprising a top left image signal, a bottom left image signal, a top right image signal, and a bottom right image signal;
determining a sequence for displaying sectional images that respectively correspond to the sectional image signals, the sectional images being portions of a whole image that has a size substantially equal to a display area of a display panel, the sectional images comprising a top left image, a bottom left image, a top right image, and a bottom right image;
using the sectional image signals to generate an image data signal; and
using the display panel to display the sectional images according to data signals generated based on the image data signal and according to the sequence, wherein the top right image is displayed before or after the bottom right image according to the sequence,
wherein the top left image represents an image of a viewed point of an object that is viewed by the left eye of a viewer from a first viewpoint positioned above an imaginary reference plane that passes through the viewed point and is perpendicular to a display surface of the display panel,
wherein a first imaginary view line connecting the viewed point and the first viewpoint is at a first predetermined angle with respect to the imaginary reference plane,
wherein the bottom left image represents an image of the viewed point of the object that is viewed by the left eye of the viewer from a second viewpoint positioned under the imaginary reference plane,
wherein a second imaginary view line connecting the viewed point and the second viewpoint is at a second predetermined angle with respect to the imaginary reference plane,
wherein the top right image represents an image of the viewed point of the object that is viewed by the right eye of the viewer from a third viewpoint positioned above the imaginary reference plane, wherein a third imaginary view line connecting the viewed point and the third viewpoint is at a third predetermined angle with respect to the imaginary reference plane, wherein the bottom right image represents an image of the viewed point of the object that is viewed by the right eye of the viewer from a fourth viewpoint positioned under the reference plane, and wherein a fourth imaginary line connecting the viewed point and the fourth viewpoint is at a fourth predetermined angle with respect to the imaginary reference plane.

10. The method of claim 9, wherein the first predetermined angle is equal to the third predetermined angle.

11. The method of claim 9, wherein the first predetermined angle is equal to the second predetermined angle.

12. The method of claim 9,
wherein the image signal includes a left eye image signal and right eye image signal,
wherein the left eye image signal includes top left image information and bottom left image information,
wherein the right eye image signal includes the top right image information and bottom right image information,
wherein the generating the sectional image signals comprises:
   generating the top left image signal and the bottom left image signal by separating the top left image information and bottom left image information; and
   generating the top right image signal and the bottom right image signal by separating the top right image information and bottom right image information.

13. The method of claim 9,
wherein the image signal includes a left eye image signal and a right eye image signal, and
wherein the generating the sectional image signals comprises:
   applying a first transformation matrix to transform at least a first portion of the left eye image signal into the top left image signal;
   applying a second transformation matrix to transform at least a second portion of the left eye image signal into the bottom left image signal;
   applying a third transformation matrix to transform at least a first portion of the right eye image signal into the top right image signal; and
   applying a fourth transformation matrix to transform at least a second portion of the right eye image signal into the bottom right image signal.

14. The method of claim 9, further comprising: arranging the sectional image signals according to the sequence in the image data signal.

15. The method of claim 9, further comprising: generating one or more control signals for controlling the display panel to display all of the sectional images in $1/60$ second according to the sequence.

16. The method of claim 9, further comprising:
controlling a first shutter to be light-transmitting in a first period and in a second period immediately following the first period;
controlling the first shutter to be light-blocking in a third period immediately following second period and in a fourth period immediately following the third period;
controlling a second shutter configured to be light-blocking in the first period and the second period;
controlling the second shutter to be light-transmitting in the third period and in the fourth period; and
using the display panel to sequentially display four of the sectional images in the first period, the second period, the third period, the fourth period, respectively, according to the sequence.

17. The method of claim 16, further comprising:
disposing the first shutter between the display panel and the left eye of a viewer; and
disposing the second shutter between the display panel and the right eye of the viewer.

* * * * *